(12) United States Patent
Radu et al.

(10) Patent No.: US 11,693,859 B2
(45) Date of Patent: Jul. 4, 2023

(54) SYSTEMS AND METHODS FOR DATA RETRIEVAL FROM A DATABASE INDEXED BY AN EXTERNAL SEARCH ENGINE

(71) Applicants: Atlassian Pty Ltd., Sydney (AU); Atlassian Inc., San Francisco, CA (US)

(72) Inventors: Alexandru Sorin Radu, Sydney (AU); Kara Grace Hatherly, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/138,496

(22) Filed: Dec. 30, 2020

(65) Prior Publication Data
US 2022/0207033 A1   Jun. 30, 2022

(51) Int. Cl.
*G06F 16/2455* (2019.01)
*G06F 16/2458* (2019.01)

(52) U.S. Cl.
CPC ...... *G06F 16/2455* (2019.01); *G06F 16/2458* (2019.01)

(58) Field of Classification Search
None
See application file for complete search history.

(56) References Cited

U.S. PATENT DOCUMENTS

| | | | | |
|---|---|---|---|---|
| 6,338,056 B1* | 1/2002 | Dessloch | ............ | G06F 16/2228 707/711 |
| 6,424,980 B1* | 7/2002 | Iizuka | ............ | G06F 16/84 707/E17.084 |
| 9,330,140 B1* | 5/2016 | Bogrett | ............ | G06F 16/2456 |
| 2003/0140027 A1* | 7/2003 | Huttel | ............ | G06F 16/2448 |
| 2007/0244865 A1* | 10/2007 | Gordon | ............ | G06F 16/252 |
| 2015/0220601 A1* | 8/2015 | Leyba | ............ | G06F 16/258 707/706 |

* cited by examiner

*Primary Examiner* — Christopher J Raab
(74) *Attorney, Agent, or Firm* — Brownstein Hyatt Farber Schreck, LLP

(57) ABSTRACT

Aspects of the present disclosure disclose techniques for data retrieval. The method includes receiving, from a client device, a request defining an original structured query language (SQL) query; processing the SQL query to identify a set of search engine clauses included in the original SQL query; converting the set of search engine clauses into a search engine query; communicating the search engine query to a search engine for execution; receiving object identifiers for one or more objects that match the search engine query; generating a database query based on the received object identifiers; executing the database query; and receiving and returning results of the executed database query to the client device.

20 Claims, 4 Drawing Sheets

SYSTEMS AND METHODS FOR DATA RETRIEVAL FROM A DATABASE INDEXED BY AN EXTERNAL SEARCH ENGINE

TECHNICAL FIELD

Aspects of the present disclosure are directed to data processing systems and more specifically to mechanisms for retrieving data from a search engine.

BACKGROUND

Many computer systems and applications use one or more databases to store data relevant to their operations. Depending on the operations performed by a given system, the load on a database generated by read and/or write requests can be significant.

SUMMARY

In certain embodiments of the present disclosure, a computer-implemented method is disclosed. The method includes receiving, from a client device, a request defining an original structured query language (SQL) query and processing the SQL query to identify a set of search engine clauses included in the original SQL query. The method also includes converting the set of search engine clauses into a search engine query; communicating the search engine query to a search engine for execution; and receiving object identifiers for one or more objects that match the search engine query. The method further includes generating a database query based on the received object identifiers; executing the database query; and receiving and returning results of the executed database query to the client device.

In some further embodiments, a computer processing system is disclosed. The computer processing system includes a processing unit, a communications interface, and a non-transitory computer-readable storage medium storing sequences of instructions. When the instructions are executed by the processing unit, they cause the processing unit to: receive, from a client device, a request defining an original structured query language (SQL) query and process the SQL query to identify a set of search engine clauses included in the original SQL query. In addition, when the instructions are executed, they cause the processing unit to convert the set of search engine clauses into a search engine query; communicate the search engine query to a search engine for execution; and receive object identifiers for one or more objects that match the search engine query. Further still, when the instructions are executed, they cause the processing unit to generate a database query based on the received object identifiers; execute the database query; and receive and returning results of the executed database query to the client device.

In yet other embodiments, a non-transitory computer readable medium is disclosed. The non-transitory computer-readable storage medium stores sequences of instructions, which when executed by a processing unit, cause the processing unit to: receive, from a client device, a request defining an original structured query language (SQL) query and process the SQL query to identify a set of search engine clauses included in the original SQL query. In addition, when the instructions are executed, they cause the processing unit to convert the set of search engine clauses into a search engine query; communicate the search engine query to a search engine for execution; and receive object identifiers for one or more objects that match the search engine query. Further still, when the instructions are executed, they cause the processing unit to generate a database query based on the received object identifiers; execute the database query; and receive and returning results of the executed database query to the client device.

Figure 1:
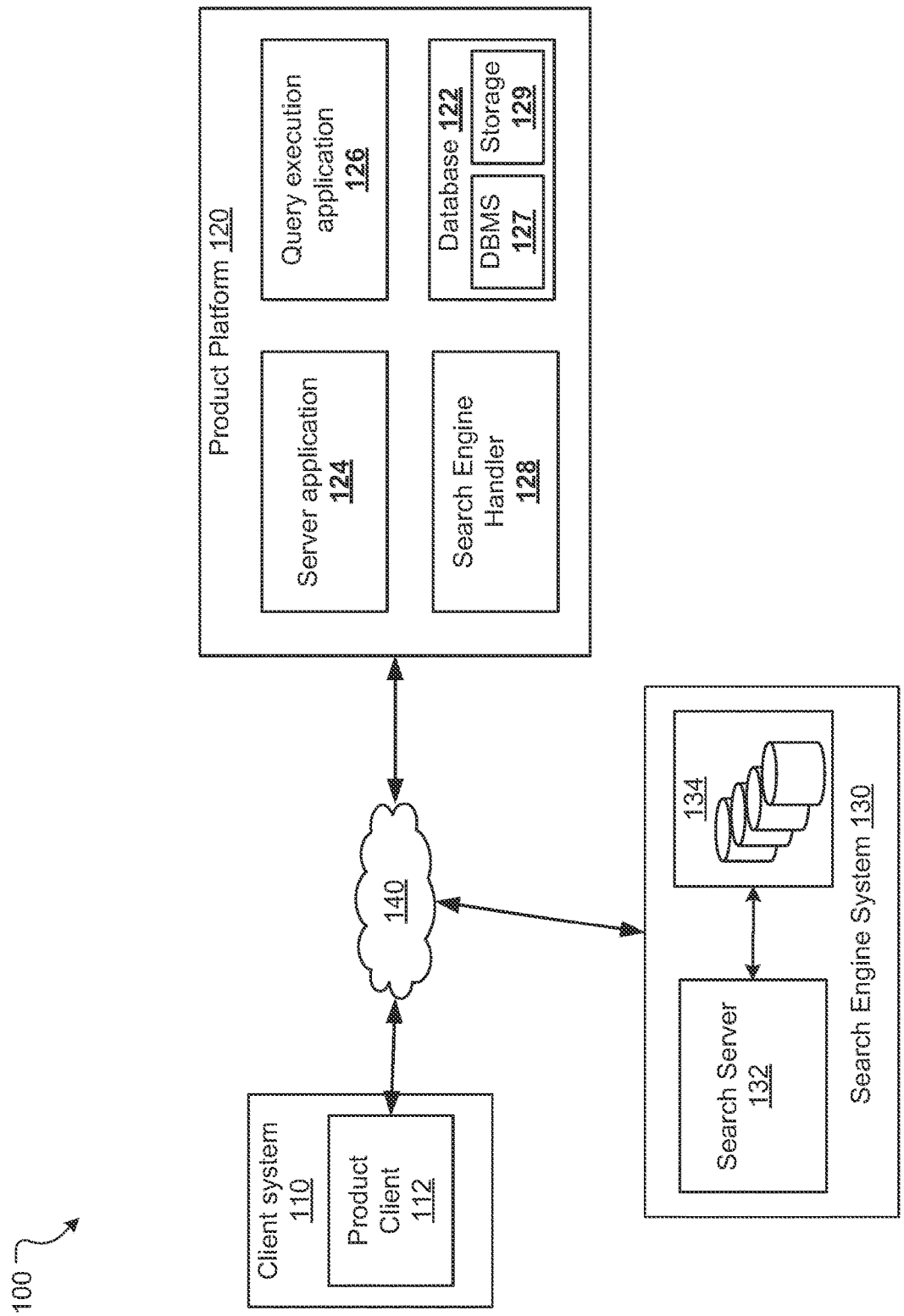
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Many computer systems use databases to store data. A common way of storing and retrieving data from a given database is via execution of structured query language (SQL) queries or statements. SQL queries are most commonly used to read and/or write data to from relational databases (that is, databases that make use of a relational data model). SQL queries can, however, also be used with other database models.

Generally speaking, an SQL query is made up of one or more clauses. A clause can include a field, an operator, and a value or function. One example of a clause may be "PROJECT=TEST". In this clause, PROJECT is the field, TEST is the value and '=' is the operator. If this clause is run on a database that stores multiple projects and each project stores multiple objects, the clause can return a list of objects associated with the project 'Test'. An SQL query may include multiple such clauses strung together.

Typically, when a search query is received from a client system, the SQL query is scanned. It is then parsed to identify syntactical errors and correctness of data types. If the query passes this step, the query is decomposed into clauses and each clause is translated to an equivalent relational algebra expression. In some examples, a database management system (that is configured to receiving the query, run the query on the underlying relational database, and return search results) generates a query tree from the parsed SQL query. The tree represents the relational algebra expression of the query, where underlying database tables of the relational database are represented as leaf nodes and the relational algebra operations are represented as the internal nodes. The root of the tree represents the query as a whole.

During execution, an internal node is executed whenever its operand tables are available. The node is then replaced by a result table. This process continues for all internal nodes until the root node is executed and replaced by a result table.

Often, running SQL queries requiring joining two or more underlying tables in the relational database, searching in those joined tables for results that satisfy the query, and returning the search results. This may not be computationally complex for databases that store limited data, but can become significantly time consuming when the underlying database stores thousands of tables, each table including hundreds of thousands of objects if not millions of objects.

As one example of this, consider an issue tracking system, which allows users to create issues and track created issues through an issue lifecycle. For example, a helpdesk or service desk system may allow users to create issues for each new enquiry received. A new issue may be created in an 'open' state, and as the issue is handled, it may transition between various states—for example 'in progress', 'resolved', 'closed', and 'reopened'. For such a system, database queries to return a list of open issues may be set to automatically execute every n seconds in order to return a list of issues meeting defined criteria. The returned list of issues can then be displayed to a user (or otherwise used by a human or program). For example, an 'open issues' query designed to return all open issues assigned to a user or a team (and potentially order such issues by severity/criticality) may be created and set to execute periodically.

As another example, an issue tracking system may allow users to create issues and track issues that relate to tasks in a software development lifecycle. In this case, and by way of example, new tasks (issues) may transition between states such as 'to do', 'in progress', 'ready for quality assurance', 'done', 'reopened', and 'blocked' (if the task cannot be completed due to a dependency on another task). In this case, a 'blocked task' query may be created for periodic execution.

Such issue tracking systems may store issue data for millions of issues and running multiple SQL queries on such systems can push the underlying database to its limits. In particular, text searches in such systems can be time and computationally slow. Further, SQL queries from complicated searches that require multiple table joins can cause serious load on the underlying database.

Embodiments of the present disclosure overcome one or more of these issues by utilizing an external search engine, which indexes data stored in the relational database. When an initial SQL query is received from a user device, the query is converted into a query suitable for the external search engine and forwarded to the search engine. Results from the search engine (e.g., object identifiers of objects that match the query) are received and inserted back into the initial SQL query. The updated initial SQL query (with the object identifiers) is then used to retrieve object data for the object identifiers from the relational database and the received object data if forwarded for display on the user device that generated the initial SQL query.

In the embodiment described above, it is assumed that all the data maintained by the database is indexed by the search engine and therefore the search engine can handle all types of syntactically correct queries.

In other embodiments, the search engine may only index certain types of the data maintained by the database. In such embodiments, the present disclosure provides a mechanism for retrieving data for a query that involves processing an initial SQL query to separate clauses defined therein into what will be referred to as search engine clauses and database clauses. In this context, the term search engine clauses refers to clauses that can be handled by the search engine and the term database clauses refers to clauses that cannot be handled by the search engine (e.g., because the search engine does not have indexed data related to the clauses) and/or can be handled directly by the database. If the query defines at least one search engine clause, that clause is converted into a search engine query and forwarded to the search engine. Results for that clause (in the form of object identifiers) are retrieved from the search engine and inserted into the initial SQL query, which can then be provided to the database to retrieve object data for the object identifiers (received from the search engine) and object data for any database clauses within the updated initial SQL query.

By executing part of or the complete SQL query using a search engine, embodiments of the present disclosure reduce load on the relational database. Some experiments have shown about an 85% reduction in database load. In addition, by executing at least a part of the SQL query using the search engine, embodiments of the present disclosure provide results for search queries faster than when using a relational database alone. Some experiments have shown relative improvement of 30% to 60% in communicating a query response to a client device when using the presently disclosed embodiments. For example, it was found that when some SQL queries are executed directly on the relational database the results of the query were provided to the user device in about 300 ms. When the same query was executed using the techniques disclosed herein, the data retrieval and display time was reduced to about 50 ms.

The techniques and operations described herein can be used (or can be adapted to be used) for queries that use various structured query language syntaxes and/or extensions—e.g. SQL, MySQL, PostgreSQL, Jira Query Language (JQL), Confluence Query Language (CQL), Lucene, Elastic Search, and other structured query language syntaxes and/or extensions.

These and other aspects of the present disclosure will be described in detail with reference to FIGS. 1-4 below.

FIG. 1 illustrates an environment 100 in which one or more aspects of the present disclosure are implemented. Specifically, FIG. 1 illustrates the various systems involved in retrieving data based on search queries according to embodiments of the present disclosure. The systems include client system 110, a product platform 120, and a search engine 130. The client system 110, product platform 120, and search engine 130 communicate with each other over one or more communication networks 140.

The product platform 120 may be a system or set of systems configured to provide any type of service/perform any type of operations for clients. In order to provide such services/operations, product platform 120 stores data in a database 122. As one example, product platform 120 may be an issue tracking system used (inter alia) to create, manage, and track issues. Product platform 120 may, however, provide other services/perform other operations.

In the present example, product platform 120 includes a server application 124, a query execution application 126, and a search engine handler 128.

Server application 124 is executed by a computer processing system to configure that system to provide server-side functionality to one or more corresponding client applications (e.g. client application 112 as discussed below). Server application 124 comprises one or more application programs, libraries, APIs or other software elements that implement the features and functions that are described herein. For example, where the client application 112 is a web browser, the server application 124 is a web server such as Apache, IIS, nginx, GWS, or an alternative web server. Where the client application 112 is a specific/native application, server application 124 is an application server configured specifically to interact with that client application 112.

In some embodiments, the server application 124 may be provided with both web server and application server applications.

Database 122 includes one or more database management systems (DBMS) 127 and one or more data storage systems 129 (operating on one or multiple computer processing systems). Generally speaking, DBMS 127 receives structured query language (SQL) queries from a given application (e.g., server application 124, query execution application 126, or an alternative application), interacts with data storage system 129 to read/write data as required by those queries, and responds to the relevant application with results of the query.

Database 122 may store any data relevant to the services provided/operations performed by the server application 124. In the present examples, such data includes data objects (or, in some cases, objects for short). In this context, a data object is a logical grouping of data. Data for a data object may be stored across multiple database records (e.g. across multiple database tables) that are related to one another by one or more database keys (for example object identifiers and/or other identifiers).

By way of specific example, where product platform 120 is an issue tracking system, data objects may be related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

The query execution application 126 is configured to receive a query from a client system 110. If the query is not already in the form of an SQL query, the query execution application 126 is configured to convert the received query into an SQL query, parse the query, identify clauses, generate a query tree, execute the query on the database 122 and return the results to the requesting client system 110. In addition, the query execution application 126 may be configured to analyze the query clauses to identify search engine clauses and database clauses, forward the search engine clauses to the search engine handler 128, receive results for the search engine clauses from the search engine handler 128, insert the results in the SQL query (in place of the corresponding search engine clauses), and execute the updated SQL query in the database 122.

The search engine handler 128 is configured to receive search engine clauses from the query execution application 126, convert the search engine clauses into query language suitable for the search engine 130, forward the converted query to the search engine 130, receive results from the search engine 130 in response to the query and forward the results to the query execution application 126. For example, if the search engine 130 uses ElasticSearch, the search engine handler may convert the search engine clauses into ElasticSearch clauses. Further, if the SQL query includes identifiers used by the database 122, the search engine handler 128 may be configured to convert those identifiers into the identifiers used by the search engine 130. For instance, if a search engine clause is "Project=project 123" and the search engine 130 stores project information under the field "Project_uuid", the search engine handler 128 may convert the clause into "Project_uuid=project 123".

In certain embodiments, product platform 120 is a multi-tenanted system: i.e., server application 124 serves multiple tenants. In these embodiments, any request received by the product platform 120 is associated with a particular tenant—e.g. via a tenant identifier. For example, a given request may be received from/initiated by a particular account, and the identifier for that account will be associated with a tenant identifier.

The applications executed by product platform 120 typically run on multiple computer processing systems. For example, in some implementations each component of the product platform 120 may be executed on a separate computer processing system. In other embodiments, multiple (or even all) components of the product platform 120 may run on a single computer processing system. In certain cases, a clustered server architecture may be used where applications are executed across multiple computing instances (or nodes) that are commissioned/decommissioned on one or more computer processing systems to meet system demand.

Client system 110 hosts a client application 112 which, when executed by the client system 110, configures the client system 110 to provide client-side functionality. This may include, for example, interacting with (i.e., sending data to and receiving data from) server application 124. Such interactions typically involve logging on (or otherwise accessing) server application 124 by providing credentials for a valid account maintained by the product platform 120. As noted above, in certain embodiments the account may be associated with a particular tenant identifier. Once validated, a user can perform various functions using client application 112, for example generating requests to read data from or write data to database 122, automating such requests (e.g., setting requests to periodically execute at certain times), and other functions.

Client application 112 may be a general web browser application (such as Chrome, Safari, Internet Explorer, Opera, or an alternative web browser application) which accesses a server application such as 124 via an appropriate uniform resource locator (URL) and communicates with the server application via general world-wide-web protocols (e.g. http, https, ftp). Alternatively, client application 112 may be a specific/native application programmed to communicate with a server application using defined application programming interface (API) calls.

A given client system 110 may have more than one client application 112, for example both a general web browser application and a dedicated programmatic client application.

Client system 110 may be any computer processing system which is configured (or configurable) by hardware and/or software to offer client-side functionality. By way of example, suitable client systems may include server computer systems, desktop computers, laptop computers, netbook computers, tablet computing devices, mobile/smart phones, and/or other computer processing systems.

The search engine 130 includes a search server 132 and a data store 134. The search server 132 receives/responds to search queries from the product platform 120 (and in particular the search engine handler 128) and communicates with the data store 134 to retrieve/store data. As described in detail below, the search engine 130 is operated to index certain content stored by the database 122 in order to allow for searching of that content. To this end, when changes are made to the content managed by the product platform 120 indexing processes operate to make corresponding changes to the content and search index maintained by the search engine 130.

To receive search queries and provide results, the search engine 130 provides a search interface (not shown) which the search engine handler 128 can access via appropriate API calls. When the search engine handler 128 submits a search query, the search engine 130 analyzes the query and identifies search results pertinent to the query from the search index. The search results are then transmitted back to the search engine handler 128 for further processing.

The search server 132 may be scalable and may include multiple server nodes (called a cluster) configured to perform indexing and/or multiple searches simultaneously. The data store 134 may also be distributed and store data over multiple computing devices.

In one example, the search engine 130 may be the ElasticSearch search engine developer by Elastic Nev. In other examples, other search engine systems could be used, such as Apache Solr and Sphinx The client system 110, product platform 120 (or applications of the product platform 120), and search engine 130 communicate data between each other either directly or indirectly through one or more communications networks 140. Communications network 140 may comprise a local area network (LAN), a public network, or a combination of networks.

The embodiments and features of the present disclosure are implemented using one or more computer processing systems. For example, client system 110 is a computer processing system and product platform 120 includes various applications and components that are provided by one or more computer processing systems.

Figure 2:
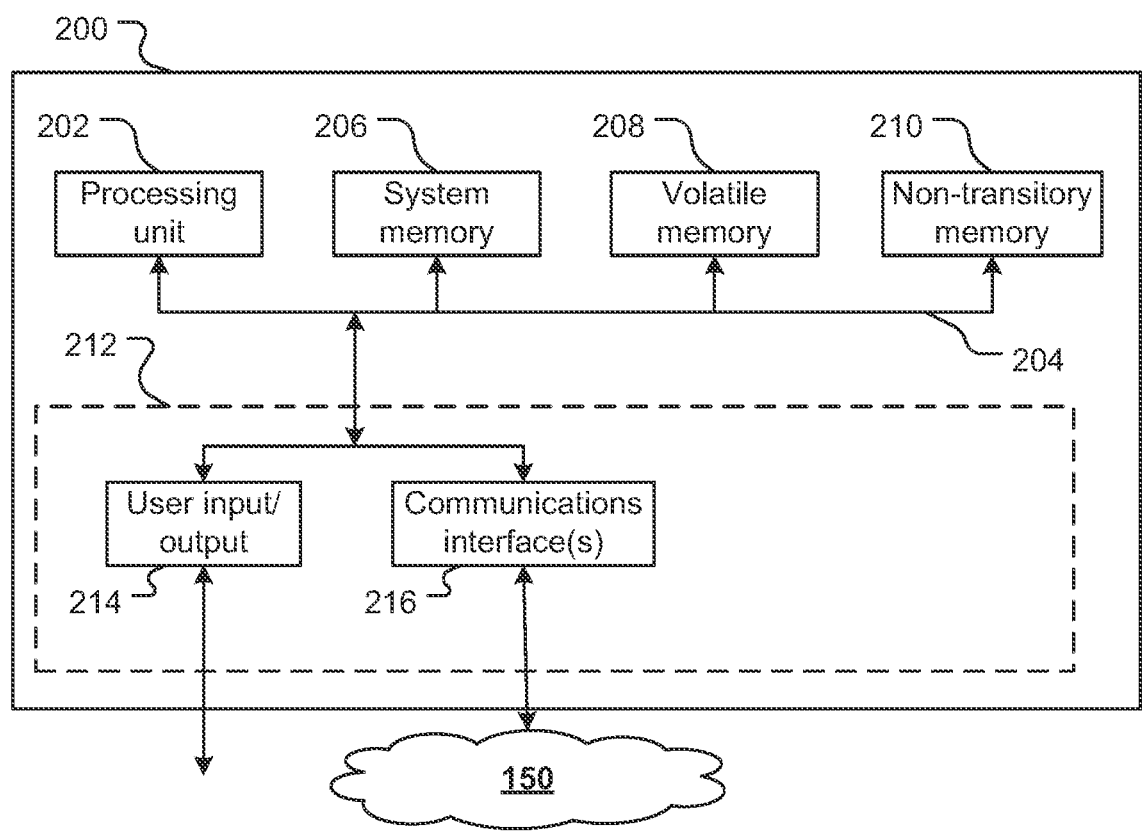
FIG. 2 is a block diagram of a computing system with which various embodiments of the present disclosure may be implemented.

FIG. 2 provides a block diagram of a computer processing system 200 configurable to implement embodiments and/or features described herein. System 200 is a general-purpose computer processing system. It will be appreciated that FIG. 2 does not illustrate all functional or physical components of a computer processing system. For example, no power supply or power supply interface has been depicted, however system 200 either carries a power supply or is configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202—for example a general or central processing unit, a graphics-processing unit, or an alternative computational device). Computer processing system 200 may include a plurality of computer processing units. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204, processing unit 202 is in data communication with one or more computer readable storage devices, which store instructions and/or data for controlling operation of the processing system 200. In this example system 200 includes a system memory 206 (e.g. a BIOS), volatile memory 208 (e.g. random access memory such as one or more DRAM applications), and non-volatile (or non-transitory) memory 210 (e.g. one or more hard disks, solid-state drives, or other non-transitory computer readable media). Such memory devices may also be referred to as computer readable storage media (or a computer readable medium).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 200 connects—whether by wired or wireless means—include one or more input/output devices (indicated generally by input/output device interface 214). Input devices are used to input data into system 200 for processing by the processing unit 202. Output devices allow data to be output by system 200. Example input/output devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads (and/or other touch/contact sensing devices, including touch screen displays), microphones, accelerometers, proximity sensors, GPS devices, touch sensors, and/or other input devices. System 200 may also include or connect to one or more output devices controlled by system 200 to output information. Such output devices may include devices such as displays (e.g. cathode ray tube displays, liquid crystal displays, light emitting diode displays, plasma displays, touch screen displays), speakers, vibration applications, light emitting diodes/other lights, and other output devices. System 200 may also include or connect to devices which may act as both input and output devices, for example memory devices/computer readable media (e.g. hard drives, solid state drives, disk drives, compact flash cards, SD cards, and other memory/computer readable media devices) which system 200 can read data from and/or write data to, and touch screen displays which can both display (output) data and receive touch signals (input).

System 200 also includes one or more communications interfaces 216 for communication with a network, such as network 140 of environment 100. Via a communications interface 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory computer readable media accessible to system 200. For example, instructions and data may be stored on non-transitory memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows™, Apple macOS™, Apple iOS™, Android™, Unix™ or Linux™.

System 200 also stores or has access to applications which, when executed by the processing unit 202, configure system 200 to perform various computer-implemented processing operations described herein. For example, and referring to networked environment 100 of FIG. 1 above, client system 110 includes a client application 112 which configures the client system 110 to perform client system operations, and product platform 120 includes server application 124 which configures the server environment computer processing system(s) to perform the described server environment operations.

In some cases part or all of a given computer-implemented method will be performed by a single computer processing system 200, while in other cases processing may be performed by multiple computer processing systems in data communication with each other.

As the search engine 130 indexes data stored in the database 122, it is important for the indexed data in the search engine 130 to be up to date and be synchronized with the data in the database 122. In some examples, the search engine handler 128 may be configured to synchronize the content maintained by the database 122 with the content indexed by the search engine 130.

In order to perform this synchronization, the search engine handler 128 may include a module that is configured to listen for/receive trigger events generated by the server application 124 or the database 122. These trigger events are generated when any changes are made to the data maintained by the database 122—e.g., because the assignee of an issue has been updated, a new issue has been created, an issue status has changed, etc. When the search engine handler 128 receives any trigger events it processes the events to extract relevant details and generates event descriptors. The search engine handler 128 is configured to generate event descriptors of a standard format. This allows the search engine and search engine handler 128 to work with different product platforms 120, which may provide event information in different formats. As one example, the search engine handler and search engine may be configured to work with a cloud based ITS system, which provides trigger events in one format, and to work with an enterprise ITS system, which provides trigger events in a different format.

The generated event descriptors are queued and fed in a controlled manner to the indexing module (not shown) of the search engine handler for further processing. The search engine handler 128 may also, or alternatively, be configured to determine whether duplicate event descriptors have been queued and, if so, remove the duplicates. Duplicate event descriptors may be queued, for example, when an event descriptor is generated for a first update to an issue and very quickly followed by another update to the same issue even before the first issue update is indexed.

The indexing module processes the queued event descriptors depending on the type of event. For example, if a given event descriptor indicates that an issue has been updated; the indexing module operates to retrieve the files that have changed from the database 122 and pass those files to the search engine 130 for indexing. In this manner, the search engine 130 can be updated continuously such that it indexes the latest data available in the database 122.

Figure 3:
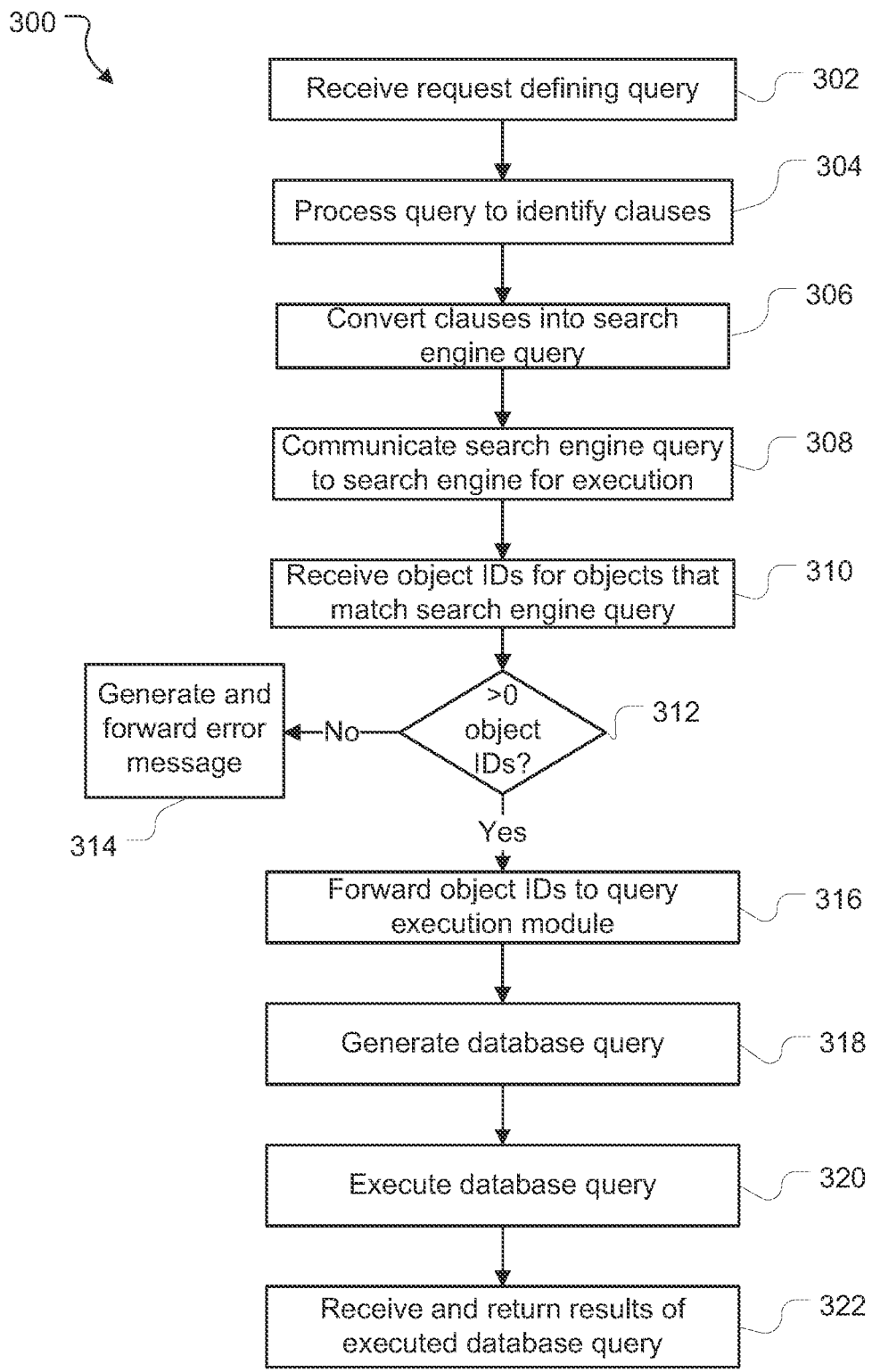
FIG. 3 is a flowchart illustrating a method for retrieving data for a search query according to some embodiments of the present disclosure.

FIG. 3 illustrates an example method 300 for retrieving data for a request according to some embodiments of the present disclosure. In this example method 300, the entire query is passed to the search engine 130 for execution. The search engine 130 provides a list of object identifiers that satisfy the query and these object identifiers are used to query the database 122 and retrieve corresponding object data.

The method 300 commences at step 302, where the query execution application 126 receives a request. The request defines a structured query language (SQL) query (e.g., a string) that is made up of one or more clauses. The request may be a database request that includes the SQL query. Alternatively, the request may include data that causes a SQL query to be generated or references a previously saved SQL query that can be retrieved (from product platform 120 or elsewhere). The query defined by the request received at step 302 will be referred to as the original query.

In certain embodiments, the request is associated additional data. For example, the request may be is associated with an account identifier that identifies an account (e.g., an account that is responsible for the request being made or that the request is to be executed on behalf of). Where the product platform 120 provides services to multiple tenants, the request may also be associated with a tenant identifier (identifying a tenant that the account is associated with).

Query execution application 126 may receive a request from various systems or applications. For example, the request may be received from: an end user client application (such as client application 112); a server application (such as server application 124) that has received a request from a client application (such as client application 112) and passes the query request to the query execution application 126 for execution; a server application (such as server application 124) that has been programmed to automatically generate the request; a scheduling system/application which is configured to periodically execute defined queries; an alternative system or application (under human or programmatic control).

At step 304, the query execution application 126 processes the query. As discussed previously, processing the query includes parsing the query to check whether the syntax of the query is correct (e.g., whether the correct operators have been used, whether values or functions are provided) and whether the data fields used in the query are accurate. Once the query is parsed, the query execution application 126 breaks the query down into one or more search engine clauses.

In one example, a base JQL query may be, "summary—exception OR description—exception". This query may be used to return any issues that contain the word "exception" either in the summary field of the issue or in the description field of the issue. The SQL version of this query is as follows—

```
select "ISSUE"."id",
/* com.atlassian.jira.jql.dbquery.IssueKeyClauseDbQueryFactory */
"ISSUE"."pkey" || '-' || "ISSUE"."issuenum"
from "public"."jiraissue" "ISSUE"
where (
/* com.atlassian.jira.jql.dbquery.DescriptionClauseDbQueryFactory */
(
exists(
select
from "public"."jiraissuetokens" "ISSUE_TOKENS_1"
where "ISSUE_TOKENS_1"."field" = 'description'
and "ISSUE_TOKENS_1"."tokens" @@
('exception' ::tsquery)
and "ISSUE_TOKENS_3"."issueid" = "ISSUE"."id"
)
)
or /* com.atlassian.jira.jql.dbquery.SummaryClauseDbQueryFactory */ (
exists(
select
from "public"."jiraissuetokens" "ISSUE_TOKENS_3"
where "ISSUE_TOKENS_3"."field" = 'summary'
and "ISSUE_TOKENS_3"."tokens" @@
('exception' ::tsquery)
and "ISSUE_TOKENS_3"."issueid" = "ISSUE"."id"
)
)
)
order by "ISSUE"."pkey" desc nulls first,
"ISSUE"."issuenum" desc nulls first
```

As seen above, the SQL query includes two clauses in the "where" section—one to return issue identifiers of issues that contain the word exception in the description field and the other to return issue identifiers of issues that contain the word exception in the summary field. In addition, the SQL query includes an ORDER BY clause. In this case, the query execution application breaks the SQL query into the two "where" clauses and the ORDER BY clause is considered a separate clause.

Once the one or more clauses are identified, the query execution application 126 communicates the one or more clauses to the search engine handler 128. For instance, in the example above, the query execution application 126 communicates the clause to return issue identifiers of issues that contain the word exception in the description field and the clause to return issue identifiers of issues that contain the word exception in the summary field.

In some examples, the initial SQL query may include one or more ordering clauses (e.g., see ORDER BY clause in the example SQL query above). An ordering clause is a clause that impacts the order of returned results but not the results themselves (e.g., a clause that invokes an ordering function or the like). In the present example, ordering clauses are not provided as part of the search engine clauses and the search engine query is generated to be executed without any particular/explicitly defined ordering. Any ordering required by the original SQL query can be handled in the database query (see step 318).

At step 306, the search engine handler 128 receives the one or clauses from the query execution application 126 and converts the clauses into search engine queries. As described previously, this processing includes converting the received search engine clauses into query language suitable for the search engine 130. For example, if the search engine 130 uses ElasticSearch, the search engine clauses may be converted into an ElasticSearch query. Further, if the SQL query includes data fields used by the database 122, the search engine handler 128 may be configured to convert those data fields into the fields used by the search engine 130 (if the search engine uses different data fields).

At step 308, the one or more generated search engine queries are communicated to the search engine 130 for execution. In one example, if multiple clauses are forwarded to the search engine handler 128 at step 306, the search engine handler 128 may combine the clauses into a single search engine query and communicate the single query to the search engine 130 for execution at step 308. Alternatively, it may convert clauses into corresponding search engine queries and communicate multiple search engine queries to the search engine 130.

At step 310, the search engine handler 128 receives object identifiers from the search engine 130 for one or more objects that match each of the communicated search engine queries. If no object identifiers match a given search query zero object identifiers may be returned.

In one example, the search engine query is generated so as to be executed without permissions. In such examples, permissions are taken into account on execution of a database query (see step 320) and the search engine 130 does not need to maintain any permission information. In other embodiments, where the search engine 130 is configured to also maintain permission information, permissions may be taken into account when the search engine query is executed—i.e., the search engine 130 is configured to only return object identifiers of objects that the user/application making the request is allowed to view.

Next, at step 312, a determination is made if one or more object identifiers are returned at step 310. If one or more object identifiers are not returned at step 310, e.g., because the search query was invalid, there were no results matching the search query, etc., the method proceeds to step 314 where a message indicating no results matching the query could be found is generated and communicating to the requesting entity and method 300 ends.

Alternatively, if at step 312 a determination is made that one or more object identifiers are returned at step 310, the method proceeds to step 316 where the object identifiers are forwarded to the query execution application 126.

The query execution application 126 then modifies the initial SQL to replace the search engine clauses with the received object identifiers at step 318. The modified SQL query is referred to as a database query in this disclosure. The database query is generated using the object identifiers returned by the search engine handler 128 and any other parts of the original SQL query that are required (e.g., any ordering clauses included in the original SQL query). In some examples, if the original query does not include an ordering clause, the query execution application 126 is configured to generate a predefined ordering clause and add this to the database query at step 318. By way of example, a default ordering clause may be a clause such as "ORDER BY<objectId>ASC", which orders results in ascending order according to the objectId field. In other embodiments, if the original query does not itself include an ordering clause this will be taken as an indication that the order of the results returned by a query is not important and no ordering clause is added to the database query at step 318.

Once the database query is generated, the query execution application 126 causes the database query to be executed (at step 320). In the present embodiment, query execution application 126 interfaces with database 122 to run the query, receive a set of database query results, and pass the set of database query results back to query execution application 126.

The database query is executed taking permissions into account (e.g. based on the account identifier of the account associated with the original request).

At step 320, the database query results include not only object identifiers of the ordered and/or permitted objects, but also additional object data requested in the original query. With knowledge of the relevant object identifiers, however, the cost of such a query (in a database load sense) is much cheaper.

At 322, the set of database query results along with the corresponding requested object data are returned to the relevant application—for example the application from which the request was received at 302. Method 300 then ends.

Figure 4:
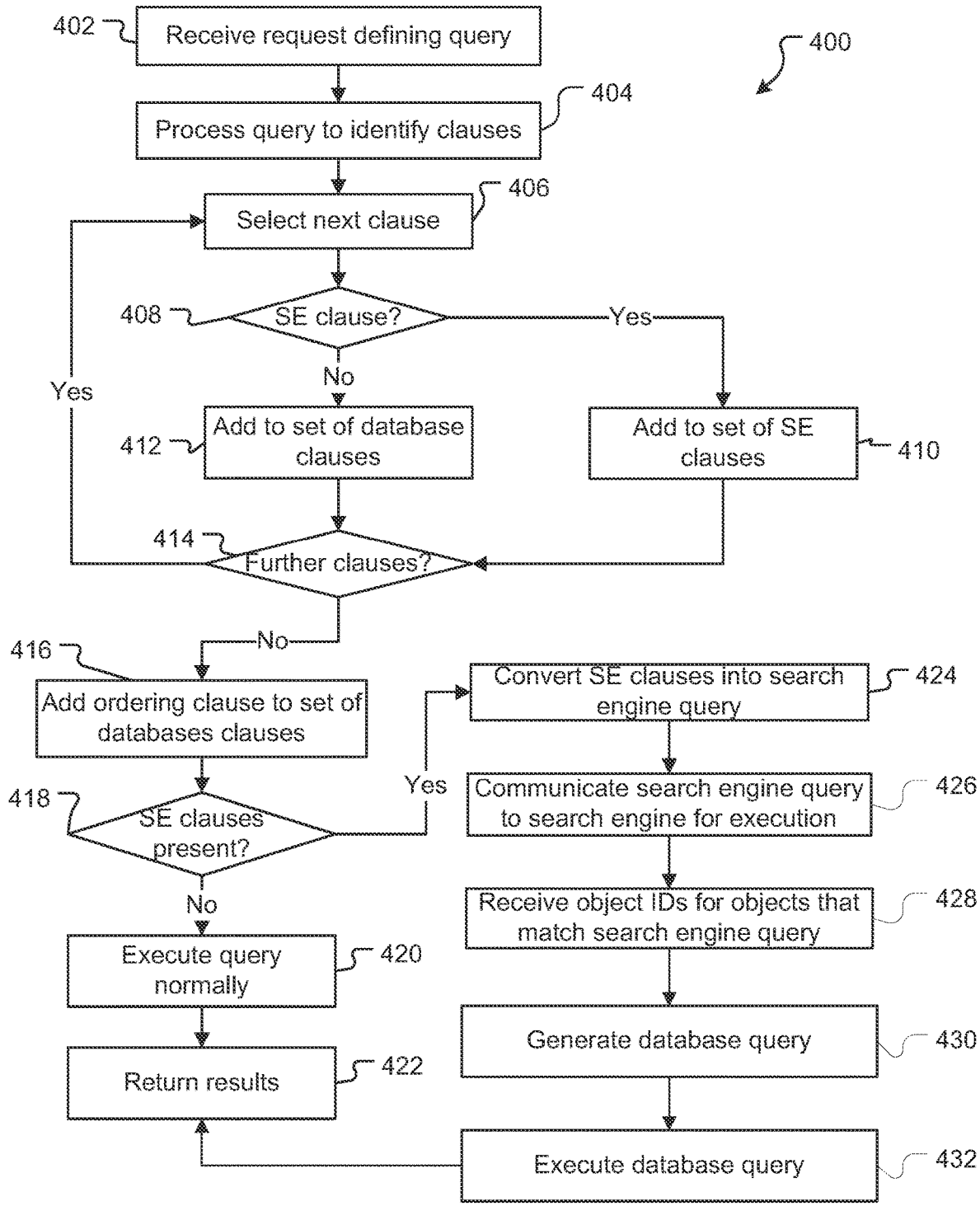
FIG. 4 is a flowchart illustrating another method for retrieving data for a search query according to some embodiments of the present disclosure.

FIG. 4 illustrates another example method 400 for retrieving data for a request according to some embodiments of the present disclosure. In this example, the search engine 130 does not index all the data maintained by the database 122. Instead, it may only index a portion of the data. For example, it may only index some issue data fields such as assignee, project identifier, status, labels, etc., but may not store issue data fields such as issue description, comments, workflow, etc. In such cases, the query execution application 126 determines which clauses of a given SQL query can be fulfilled by the search engine 130 and which clauses cannot and then forwards only the clauses that can be fulfilled by the search engine to the search engine 130 and the remaining clauses are executed on the database 122.

Method 400 begins at step 402, where the query execution application 126 receives a request. The request defines a structured query language (SQL) query (e.g., a string) that is made up of one or more clauses. The request may be a database request that includes the SQL query. Alternatively, the request may include data that causes a SQL query to be generated or references a previously saved SQL query that can be retrieved (from product platform 120 or elsewhere). The query defined by the request received at 402 will be referred to as the original query.

In certain embodiments, similar to the request described with respect to FIG. 3, the request is associated additional data, such as account identifier and/or tenant identifier and can be received from various systems or applications.

At step 404, the query execution application 126 processes the query. This processing is similar to the processing described at step 404 and therefore is not described here again.

Step 406, the query execution application 126 selects the next clause to be processed. In the present embodiment, the query execution application 126 processes clauses in the order in which they appear in the original query. Initially, therefore, query execution application 126 selects the first clause in the original query.

At 408, the query execution application 126 determines whether the currently selected clause is a search engine clause or a database clause. A clause is determined to be a search engine clause if the search engine 130 indexes the field included in the clause. To this end, the query execution application 126 maintains this information in search application configuration data. This configuration data may be updated periodically, e.g., if the search engine 130 is updated to include more fields from time to time.

If at step 408, the query execution application 126 determines the selected clause to be a search engine clause, the query execution application 126 adds the selected clause to a set of search engine clauses (also referred to as a first subset of clauses) at step 410.

Alternatively, if at step 408, the query execution application 126 does not determine a clause to be a search engine clause, the query execution application 126 determines the clause to be a database clause at step 412 and adds the selected clause to a set of database clauses (also referred to as a second subset of clauses).

As will be appreciated, the set of search engine clauses (or first subset of clauses) is different to the set of database clauses (or second subset of clauses).

At step 414, the query execution application 126 determines whether there are any unprocessed clauses in the original query. If so, processing returns to 406 to select the next unprocessed clause in the original query. If all clauses have been processed, processing continues to step 416.

Depending on the particular structured query language in question, certain parts of the original SQL query may either be added to both the set of search engine clauses and the set of database clauses or otherwise flagged for inclusion in both search engine queries and database queries (discussed below). Any other language specific constructs, which must be present to make a valid query, are also included in both the search engine and database queries.

At 416, the query execution application 126 adds an ordering clause (e.g., a clause defining an ORDER BY operation) to the set of database clauses. If the original query included an ordering clause, this clause is added to the set of database clauses. If not, in certain embodiments, the query execution application 126 is configured to generate a predefined ordering clause and add this to the set of database clauses. By way of example, the default ordering clause may be a clause such as "ORDER BY<objectId> ASC", which will order results in ascending order according to the objectId field. In other embodiments, if the original query does not itself include an ordering clause this will be taken as an indication that the order of the results returned by a query is not important and no ordering clause is added to the set of database clauses.

At step 418, the query execution application 126 determines if the original query received at 402 is supported for search engine execution. If the set of search engine clauses is empty, the query execution application 126 determines that the original query is not supported for search engine execution and processing proceeds to step 420. If the set of searching clauses is not empty, the query execution application 126 determines that the original query is supported for search engine execution and processing proceeds to step 422.

At step 420, the query execution application 126 has determined that the original query is not supported for search engine execution. In this case, query execution application 126 causes the original query to be executed normally. This may involve, for example, passing the original query to database 122, which executes the original query and returns the original query results to query execution application 126. The query execution application 126 can then return the results of the SQL query execution performed (at step 422) to the relevant application—for example the application from which the request was received at 402. Method 400 then ends.

At step 424, the query execution application 126 forwards the set of search engine clauses to the search engine handler 128, which converts the clauses into one or more search engine queries. This step is similar to step 306 and therefore is not described in detail again.

At step 426, the one or more generated search engine queries are communicated to the search engine 130. This is similar to step 308.

At step 428, the search engine handler 128 receives object identifiers from the search engine 130 for one or more objects that match the search engine querie(s). These object identifiers are forwarded to the query execution application 126.

The query execution application 126 (at step 430) then modifies the initial SQL query to replace the search engine clauses with the received object identifiers. The modified SQL query is referred to as a database query in this disclosure. The database query is generated using the object identifiers returned by execution of the search engine query at 428, the non-caching clauses (or second subset) of the original query (added to the set of database clauses at 412 and including the ordering clause added at 416), and any other parts of the original SQL query that are required (for example a SELECT operation in the SQL context).

Once the database query is generated, the query execution application 126 causes the database query to be executed (at step 432). In the present embodiment, query execution application 126 interfaces with database 122 to run the query, receive a set of database query results, and pass the set of database query results back to query execution application 126.

The database query is executed taking permissions into account (e.g. based on the account identifier of the account associated with the original request).

The database query results received upon execution of step 432 include not only object identifiers of the ordered and/or permitted objects, but also additional object data requested in the original query. With knowledge of the relevant object identifiers, however, the cost of such a query (in a database load sense) is much cheaper.

At 422, the set of database query results along with the corresponding requested object data are returned to the relevant application—for example the application from which the request was received at 402. Method 400 then ends.

To further illustrate the operations described above with respect to FIG. 4, the processing two example original SQL queries will be now be described.

In both examples, database 122 stores the following objects:

| ID | Project | Assignee | Resolution | Status | Permissions |
|---|---|---|---|---|---|
| DEMO-1 | DEMO | Empty | Won't Fix | Done | All |
| DEMO-2 | DEMO | Empty | Unresolved | Done | All |
| DEMO-3 | DEMO | Jane | Unresolved | To Do | All |
| DEMO-4 | DEMO | Matthew | Unresolved | To Do | All |
| DEMO-5 | DEMO | Matthew | Unresolved | Done | All |
| DEMO-6 | DEMO | Matthew | Unresolved | Done | None |
| NOTDEMO-1 | NOTDEMO | Matthew | Unresolved | To Do | All |

The first example is a Jira Query Language (JQL) original query as follows, execution of which has been requested by user 'Matthew'.

| Example original query |
|---|
| Project = DEMO AND<br>assignee = currentUser( ) AND<br>Resolution = Unresolved<br>ORDER BY Status ASC |

Processing according to method 400 described above generates the following sets of search engine clauses and database clauses:

| Set of search engine clauses |
|---|
| Project = DEMO AND<br>Resolution = Unresolved |

| Set of database clauses |
|---|
| Assignee = currentUser( )<br>ORDER BY Status ASC |

The search engine query includes the set of search engine clauses. Execution of the search engine query (at step 426) returns the following results (an unsorted set):

| Set of search engine query results |
|---|
| {DEMO-2, DEMO-3, DEMO-4, DEMO-5, DEMO-6} |

In this example: DEMO-1 is not returned because the resolution does not match; NOTDEMO-1 is not returned because the project does not match. As permissions are not applied in execution of the search engine query, DEMO-6 is returned.

Generation of the database query (at step 430) generates a query such as:

| Database query |
|---|
| key in (DEMO-2, DEMO-3, DEMO-4, DEMO-5, DEMO-6) AND<br>Assignee = currentUser( ) AND<br>hasPermissionToViewIssue = true<br>ORDER BY Status ASC |

Execution of the database query (at step 432) returns the following result set (a sorted list):

| Set of database query results |
|---|
| [DEMO-5, DEMO-4] |

In this case: DEMO-2 and DEMO-3 have been removed from the set of first stage query results because the assignee was not 'Matthew'; DEMO-6 has been removed because 'Matthew' did not have permission to access that record; the results have been sorted alphabetically according to their statuses. The set of database query results can then be used to retrieve any other object (issue) data in respect of the identified objects.

The second example is a SQL original query as follows, execution of which has been requested by user 'Matthew'. Semantically, this example SQL query matches the example JQL query above:

| Example original query |
| --- |
| SELECT ID FROM issues<br>WHERE<br>Project = 'DEMO' AND<br>Assignee = 'Matthew' AND<br>Resolution = 'Unresolved' AND<br>Matthew_has_access = true<br>ORDER BY Status; |

Processing according to method 400 described above generates the following sets of search engine clauses and database clauses:

| Set of search engine clauses |
| --- |
| SELECT ID FROM issues<br>WHERE<br>Project = 'DEMO' AND<br>Resolution = 'Unresolved'; |

| Set of database clauses |
| --- |
| SELECT ID FROM issues<br>WHERE<br>Assignee = 'Matthew' AND<br>Matthew_has_access = true<br>ORDER BY Status; |

The search engine query includes the set of search engine clauses. As in the JQL example above, execution of the search engine query (at step 426) returns the following results (an unsorted set):

| Set of search query results |
| --- |
| {DEMO-2, DEMO-3, DEMO-4, DEMO-5, DEMO-6} |

Generation of the database query (at step 430) generates a query such as:

| Database query |
| --- |
| SELECT ID FROM issues<br>WHERE<br>ID in (DEMO-2, DEMO-3, DEMO-4, DEMO-5, DEMO-6)<br>Assignee = 'Matthew' AND<br>Matthew_has_access = true<br>ORDER BY Status; |

As in the JQL example above, execution of the database query (at step 432) returns the following result set (a sorted list):

| Set of database query results |
| --- |
| [DEMO-5, DEMO-4] |

The set of database query results can then be used to retrieve any other object (issue) data in respect of the identified object identifiers.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method, comprising:
receiving, from a client device, a request defining a structured query language (SQL) query;
processing the SQL query to identify a set of search engine clauses and a set of non-search engine clauses within the SQL query;
converting the set of search engine clauses into a search engine query;
communicating the search engine query to a search engine for execution;
receiving, from the search engine, search results based on the search engine query, the results including object identifiers for one or more objects that match the search engine query;
replacing the set of the search engine clauses with a set of new elements generated based on the object identifiers contained in the search results;
generating a modified SQL query using the set of new elements and the set of non-search engine clauses;
executing the modified SQL query with respect to a database; and
receiving and returning results of the executed modified SQL query to the client device.

2. The computer-implemented method of claim 1, wherein processing the SQL query to identify the set of search engine clauses comprises:

identifying one or more clauses in the SQL query, and for each clause:
   determining a type of the clause;
   in response to determining that the clause is a search engine clause, adding the clause to the set of search engine clauses;
   in response to determining that the clause is a database clause, adding the clause to a set of database clauses.

3. The computer-implemented method of claim 2, wherein generating the modified SQL query includes:
   determining whether the set of database clauses is non-empty; and
   upon determining that the set of database clauses is non-empty, adding the set of database clauses to the modified SQL query.

4. The computer-implemented method of claim 1, wherein the search engine query is executed without permissions.

5. The computer-implemented method of claim 1, wherein the modified SQL query is executed with permissions.

6. The computer-implemented method of claim 1, wherein the search engine query is generated to obtain only the object identifiers from the search engine.

7. The computer-implemented method of claim 2, wherein each clause includes a field, an operator and a value and wherein the clause is determined to be the search engine clause if the search engine stores data corresponding to the field of the clause.

8. A computer processing system comprising:
   a processing unit;
   a communications interface; and
   a non-transitory computer-readable storage medium storing sequences of instructions, which when executed by the processing unit, cause the processing unit to:
      receive, from a client device, a request defining a structured query language (SQL) query;
      process the SQL query to identify a set of search engine clauses and a set of non-search engine clauses within the SQL query;
      convert the set of search engine clauses into a search engine query;
      communicate the search engine query to a search engine for execution;
      receive, from the search engine, search results based on the search engine query, the results including object identifiers for one or more objects that match the search engine query;
      replace the set of the search engine clauses with a set of new elements generated based on the object identifiers contained in the search results;
      generate a modified SQL query using the set of new elements and the set of non-search engine clauses;
      execute the modified SQL query with respect to a database; and
      receive and returning results of the executed modified SQL query to the client device.

9. The computer processing system of claim 8, wherein to process the SQL query to identify the set of search engine clauses, the non-transitory computer-readable storage medium further comprises instructions which when executed by the processing unit, cause the processing unit to:
   identify one or more clauses in the SQL query, and for each clause:
      determine a type of the clause;
      in response to determining that the clause is a search engine clause, adding the clause to the set of search engine clauses;
      in response to determining that the clause is a database clause, adding the clause to a set of database clauses.

10. The computer processing system of claim 9, wherein to generate the modified SQL query, the non-transitory computer-readable storage medium further comprises instructions which when executed by the processing unit, cause the processing unit to:
   determine whether the set of database clauses is non-empty; and
   upon determining that the set of database clauses is non-empty, add the set of database clauses to the modified SQL query.

11. The computer processing system of claim 8, wherein the search engine query is executed without permissions.

12. The computer processing system of claim 8, wherein the modified SQL query is executed with permissions.

13. The computer processing system of claim 8, wherein the search engine query is generated to obtain only the object identifiers from the search engine.

14. The computer processing system of claim 9, wherein each clause includes a field, an operator and a value and wherein the clause is determined to be the search engine clause if the search engine stores data corresponding to the field of the clause.

15. A non-transitory computer-readable storage medium storing instructions, which when executed by a processing unit, cause the processing unit to:
   receive, from a client device, a request defining a structured query language (SQL) query;
   process the SQL query to identify a set of search engine clauses and a set of non-search engine clauses within the SQL query;
   convert the set of search engine clauses into a search engine query;
   communicate the search engine query to a search engine for execution;
   receive, from the search engine, search results based on the search engine query, the results including object identifiers for one or more objects that match the search engine query;
   replace the set of the search engine clauses with a set of new elements generated based on the object identifiers contained in the search results;
   generate a modified SQL query using the set of new elements and the set of non-search engine clauses;
   execute the modified SQL query with respect to a database; and
   receive and returning results of the executed modified SQL query to the client device.

16. The non-transitory computer readable medium of claim 15, wherein to process the SQL query to identify the set of search engine clauses, the non-transitory computer-readable medium further comprises instructions which when executed by the processing unit, cause the processing unit to:
   identify one or more clauses in the SQL query, and for each clause:
      determine a type of the clause;
      in response to determining that the clause is a search engine clause, adding the clause to the set of search engine clauses; and
      in response to determining that the clause is a database clause, adding the clause to a set of database clauses.

17. The non-transitory computer readable medium of claim 16, wherein to generate the modified SQL query, the non-transitory computer-readable medium further comprises instructions which when executed by the processing unit, cause the processing unit to:
  determine whether the set of database clauses is non-empty; and
  upon determining that the set of database clauses is non-empty, add the set of database clauses to the modified SQL query.

18. The non-transitory computer readable medium of claim 15, wherein the search engine query is executed without permissions.

19. The non-transitory computer readable medium of claim 15, wherein the modified SQL query is executed with permissions.

20. The non-transitory computer readable medium of claim 15, wherein the search engine query is generated to obtain only the object identifiers from the search engine.

\* \* \* \* \*